(12) United States Patent
Makino et al.

(10) Patent No.: US 8,941,009 B2
(45) Date of Patent: Jan. 27, 2015

(54) ELECTRICAL JUNCTION BOX

(71) Applicant: Yazaki Corporation, Tokyo (JP)

(72) Inventors: Masahiro Makino, Makinohara (JP); Kouji Ueyama, Makinohara (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/899,026

(22) Filed: May 21, 2013

(65) Prior Publication Data

US 2013/0316550 A1 Nov. 28, 2013

(30) Foreign Application Priority Data

May 22, 2012 (JP) ................................. 2012-116207
Nov. 29, 2012 (JP) ................................. 2012-261457

(51) Int. Cl.
- *H02G 3/08* (2006.01)
- *B60R 16/02* (2006.01)
- *B60R 16/023* (2006.01)

(52) U.S. Cl.
CPC ............. *B60R 16/02* (2013.01); *B60R 16/0238* (2013.01); *H02G 3/08* (2013.01)
USPC .............. 174/50; 174/520; 174/59; 439/76.1; 439/76.2

(58) Field of Classification Search
CPC ......... H02G 3/08; H02G 3/081; H02G 3/088; H05K 5/00; H05K 5/02; B60R 16/02; B60R 16/0238; B60R 16/00; B60R 16/0239; H01H 9/02

USPC ........... 174/50, 17 R, 520, 59, 535, 559, 560; 439/76.1, 76.2, 949, 535; 361/600, 361/601, 679.01, 730, 752, 760, 761
See application file for complete search history.

(56) References Cited

U.S. PATENT DOCUMENTS

| | | | |
|---|---|---|---|
| 6,319,057 B2 * | 11/2001 | Sekido et al. ................. | 439/76.1 |
| 6,462,270 B1 * | 10/2002 | Depp et al. ....................... | 174/50 |
| 6,541,700 B2 * | 4/2003 | Chiriku et al. .................. | 174/50 |
| 7,253,356 B2 * | 8/2007 | Kiyota et al. ................... | 174/50 |
| 7,671,275 B2 * | 3/2010 | Kubota ........................... | 174/50 |
| 8,420,931 B2 * | 4/2013 | Soh et al. ......................... | 174/50 |
| 2010/0326690 A1 * | 12/2010 | Ejima .............................. | 174/50 |
| 2012/0073851 A1 * | 3/2012 | Takeuchi et al. ........... | 174/50.51 |

FOREIGN PATENT DOCUMENTS

JP 2007-282399 A 10/2007

* cited by examiner

*Primary Examiner* — Angel R Estrada
(74) *Attorney, Agent, or Firm* — Sughrue Mion, PLLC

(57) ABSTRACT

An electrical junction box includes an accommodation cover in which electrical parts are accommodated, and a groove that is formed on an outer surface of the accommodation cover and linearly extends in an up-down direction of the accommodation cover. The accommodation cover includes a folded wall part at which a wall surface of the groove is folded downwards. The accommodation cover includes a box body in which the electrical parts are accommodated, and a lower cover that covers a lower portion of the box body. The groove includes a first groove part formed on the lower cover. The folded wall part is formed on the first groove part.

6 Claims, 15 Drawing Sheets

ELECTRICAL JUNCTION BOX

CROSS REFERENCE TO RELATED APPLICATION

This application is based on Japanese Patent Applications Nos. 2012-116207 filed on May 22, 2012, and 2012-261457 filed on Nov. 29, 2012, the contents of which are incorporated herein by reference.

BACKGROUND OF THE INVENTION

1. Technical Field

The invention relates to an electrical junction box having an accommodation cover in which electrical parts are accommodated.

2. Background Art

An electrical junction box, in which electrical parts such as connectors, relays, fuses, or the like are intensively integrated, is mounted in an engine room to supply electric power to electronic appliances mounted e.g. in a vehicle. The electrical junction box includes an accommodation cover in which electrical parts are accommodated. The accommodation cover includes, for example, a box body accommodating electrical parts, and a lower cover section covering a lower portion of the box body, wherein the accommodation cover has a vertical linear groove for miniaturization or an improvement in rigidity (see JP-A-2007-282399).

In the electrical junction box of JP-A-2007-282399, a connector of an electrical connection member is accommodated in a groove part which is formed on an outer surface of the box body to linearly extend from an upper side to a lower side of the box body. A side cover section is provided to cover an opening part of the groove part on the box body. The lower cover section has a groove part which is provided in the proximity to and extends downward from the groove part on the box body. An electrical connection member such as an electric wire having a terminal extends from the groove part on the lower cover section.

However, the electrical junction box disclosed in JP-A-2007-282399 has a disadvantage as follows. When the engine room is washed by pressurized water, the water flows along the vertical linear groove formed on the outer surface of the accommodation cover such as the groove part formed on the lower cover section, and comes into the electrical junction box through a gap between the lower cover section and the box body.

Accordingly, the present invention has been made keeping in mind the above disadvantage, and an object of an exemplary embodiment of the present invention is to provide an electrical junction box capable of preventing water from coming into the junction box along the vertical linear groove of the accommodation cover.

SUMMARY OF THE INVENTION (1) According to an aspect of the invention, an electrical junction box includes an accommodation cover in which electrical parts are accommodated, and a groove that is formed on an outer surface of the accommodation cover and linearly extends in an up-down direction of the accommodation cover. The accommodation cover includes a folded wall part at which a wall surface of the groove is folded downwards.

(2) In the electrical junction box of (1), the accommodation cover includes a box body in which the electrical parts are accommodated, and a lower cover that covers a lower portion of the box body. The groove includes a first groove part formed on the lower cover, and the folded wall part is formed on the first groove part.

(3) In the electrical junction box of (2), the groove includes a second groove part that is formed on the box body and linearly extends from an upper side to a lower side of the box body and accommodate a connector of an electrical connection member and, the first groove part downwardly extends so as to connect with the second groove part.

(4) In the electrical junction box of (3), wherein the folded wall part is provided to extend along an outer circumference of the electrical connection member to reduce a gap with the electrical connection member disposed in the second groove part.

(5) In the electrical junction box of (4), wherein the accommodation cover covers a groove opening of the second groove part and includes a side cover section having a surrounding wall part to surround the outer circumference of the electrical connection member disposed in the second groove part to reduce the gap with the electrical connection member together with the folded wall part provided on the second groove part.

(6) In the electrical junction box of any one of (1) to (5), the folded wall part is provided to continuously extend across the wall surface from one side to another side between opposite groove sides.

(7) In the electrical junction box of any one of (1) to (6), the folded wall part includes a plurality of folded wall parts provided at a plurality of positions at an interval along a longitudinal direction of the groove and is defined as a wall at which the wall surface is folded such that an upper folded part thereof extends upwards from a lower folded wall part thereof.

(8) In the electrical junction box of any one of (1) to (7), the folded wall part includes an obtuse angled folded part folded at an obtuse angle relative to the wall surface.

According to the electrical junction box of (1), water flowing upwards along a wall surface of the groove is guided downwards from the accommodation cover by the folded wall part, thereby preventing the water from coming into the junction box along the groove extending linearly in a vertical direction of the accommodation cover.

According to the electrical junction box of (2), water flowing upwards along a wall surface of the groove is guided downwards from the lower cover section by the folded wall part before reaching the box body, thereby preventing the water from coming into the junction box along the groove part on the lower cover section extending linearly in a vertical direction.

According to the electrical junction box of (3), water flowing upwards from the groove part on the lower cover section along the groove part on the box body is guided downwards from the lower cover section by the folded wall part before reaching the box body, thereby preventing the water from coming into the junction box along the groove part on the lower cover section extending linearly in a vertical direction of the lower cover section and along the groove part on the box body.

According to the electrical junction box of (4), the folded wall part is provided to block a gap between the electrical connection member and the groove part on the box body, thereby preventing the water from moving through the gap between the electrical connection member and the wall surface of the groove part on the box body and flowing upwards.

According to the electrical junction box of (5), the folded wall part provided on the groove part on the box body and the surrounding wall part of the side cover section are provided to surround and block gaps between an outer circumference of the electrical connection member and the wall surface of the groove part on the box body and between the outer circumference of the electrical connection member and the side cover section, thereby preventing the water from escaping from the gaps between the electrical connection member and the wall surface of the groove part on the box body and between the electrical connection member and the side cover section and flowing upwards.

According to the electrical junction box of (6) of the invention, a majority of the water flowing upwards along the wall surface of the groove is guided to the folded wall part.

According to the electrical junction box of (7) of the invention, in a case where water flows upwards over the lower folded wall part, the water is guided downwards from the lower cover section by the upper folded wall part, thereby securely preventing the water from coming into the junction box along the groove extending linearly in a vertical direction.

According to the electrical junction box of (8) of the invention, the water is smoothly guided downwards by the obtuse angled folded part and stays in the folded wall part, thereby preventing the water from flowing upwards over the folded wall part.

DESCRIPTION OF EMBODIMENTS

An illustrative embodiment of an electrical junction box will now be described in detail with reference to the accompanying drawings.

[Exemplary Embodiments]

Figure 1:
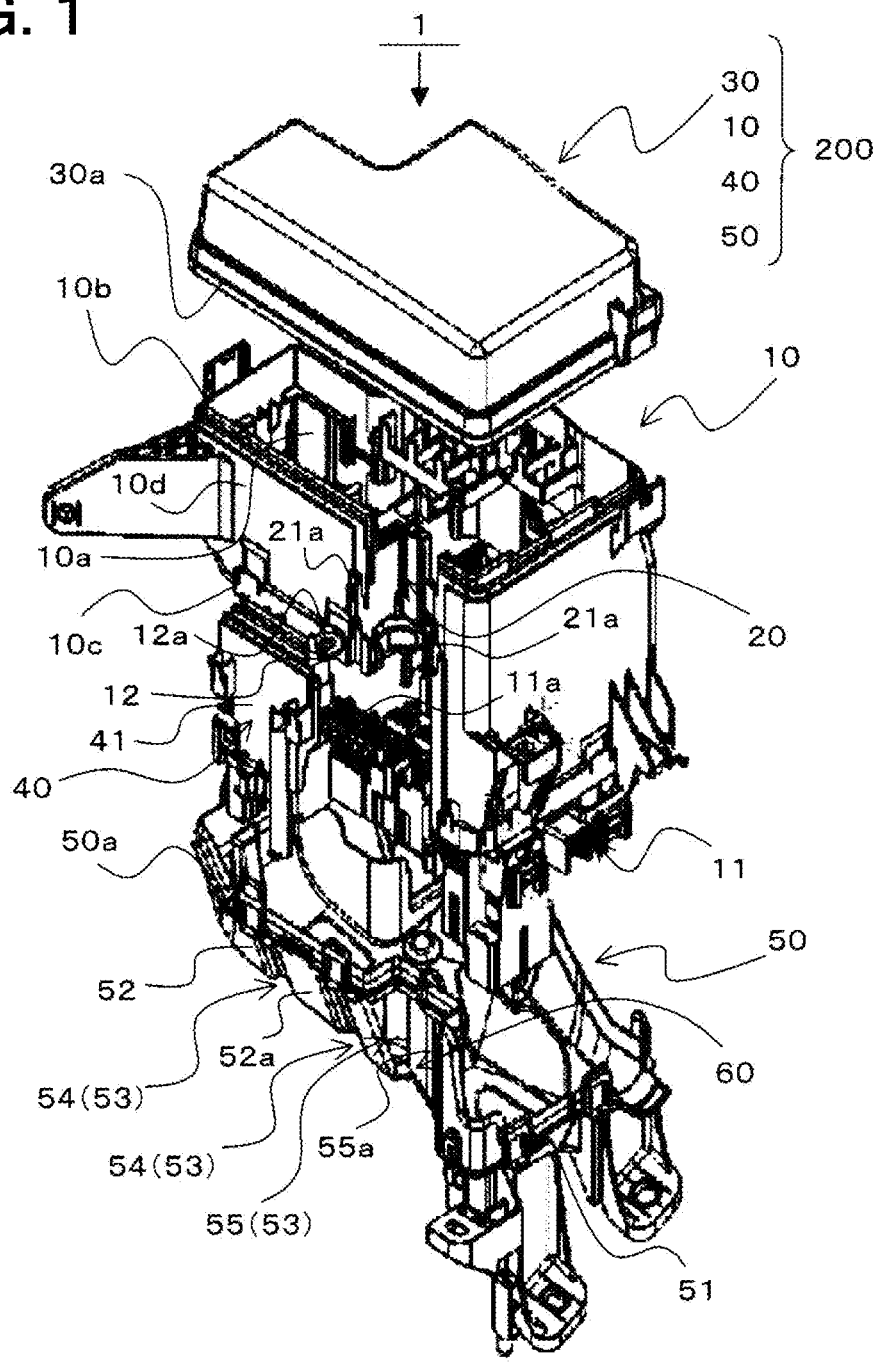
FIG. 1 is an exploded perspective view of an electrical junction box according to an illustrative embodiment of the present invention.
Figure 2:
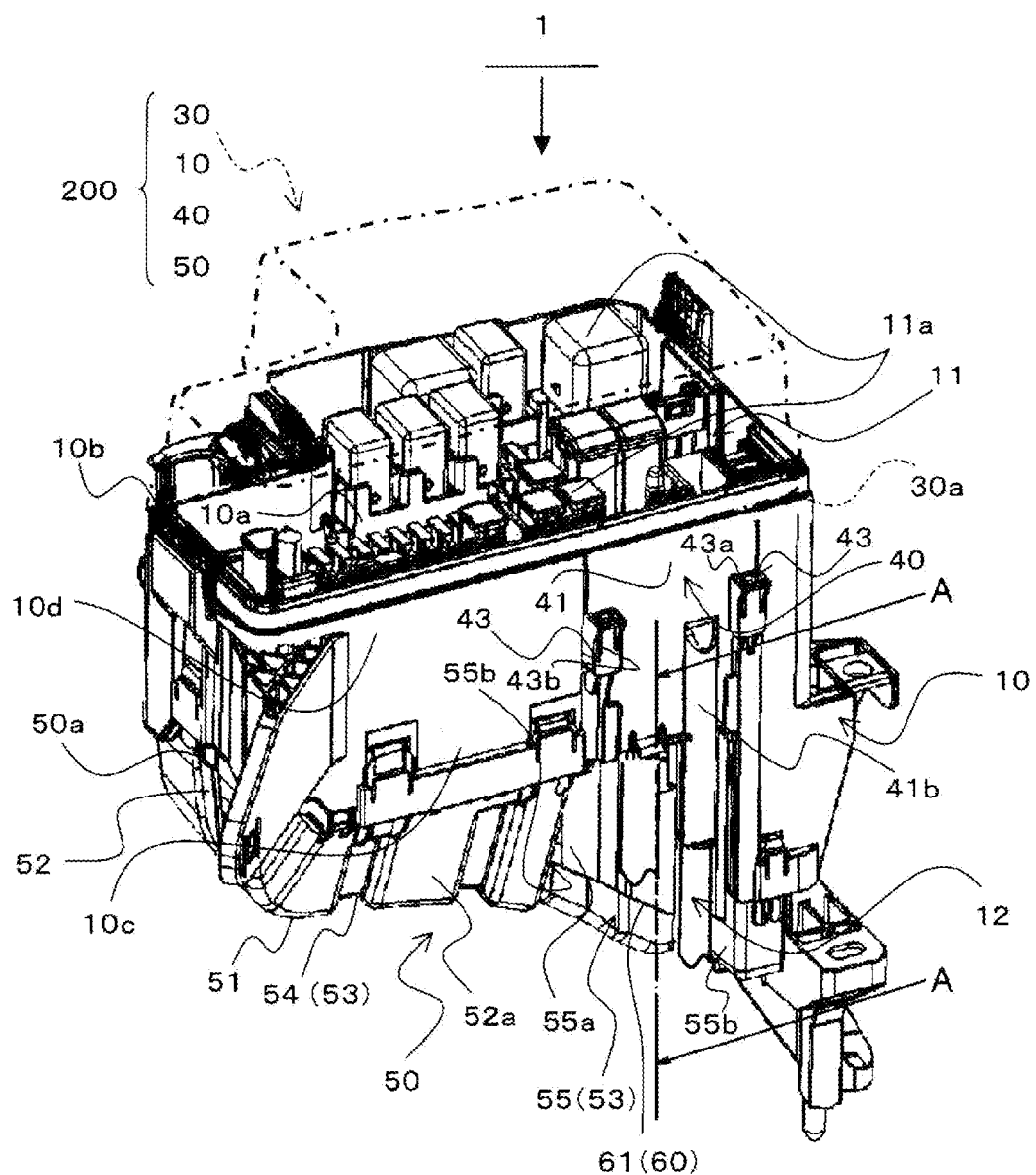
FIG. 2 is a perspective view of the electrical junction box shown in FIG. 1.
Figure 3:
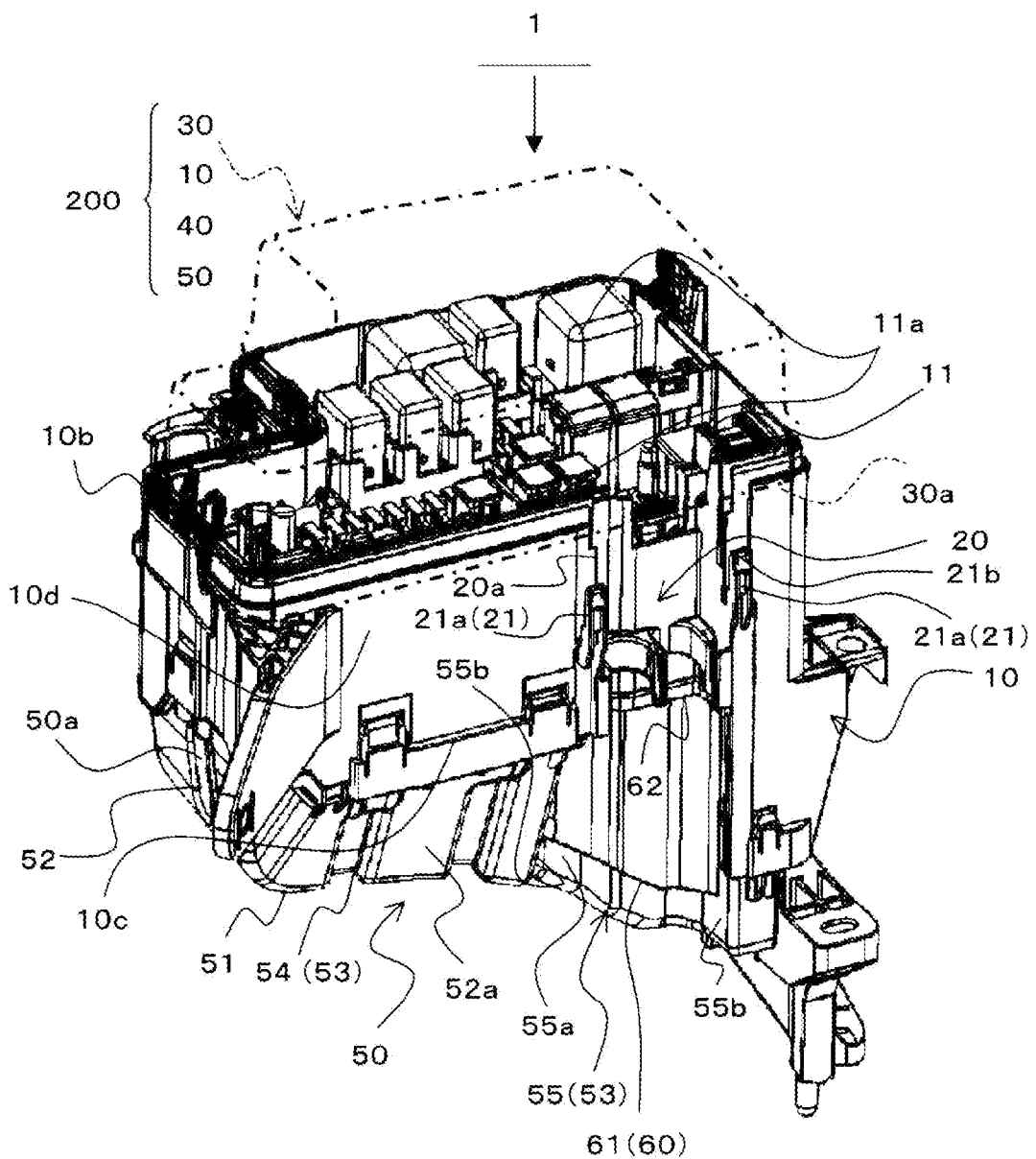
FIG. 3 is a view of the electrical junction box shown in FIG. 2 in which a side cover section and an electrical connection member are omitted.
Figure 4:
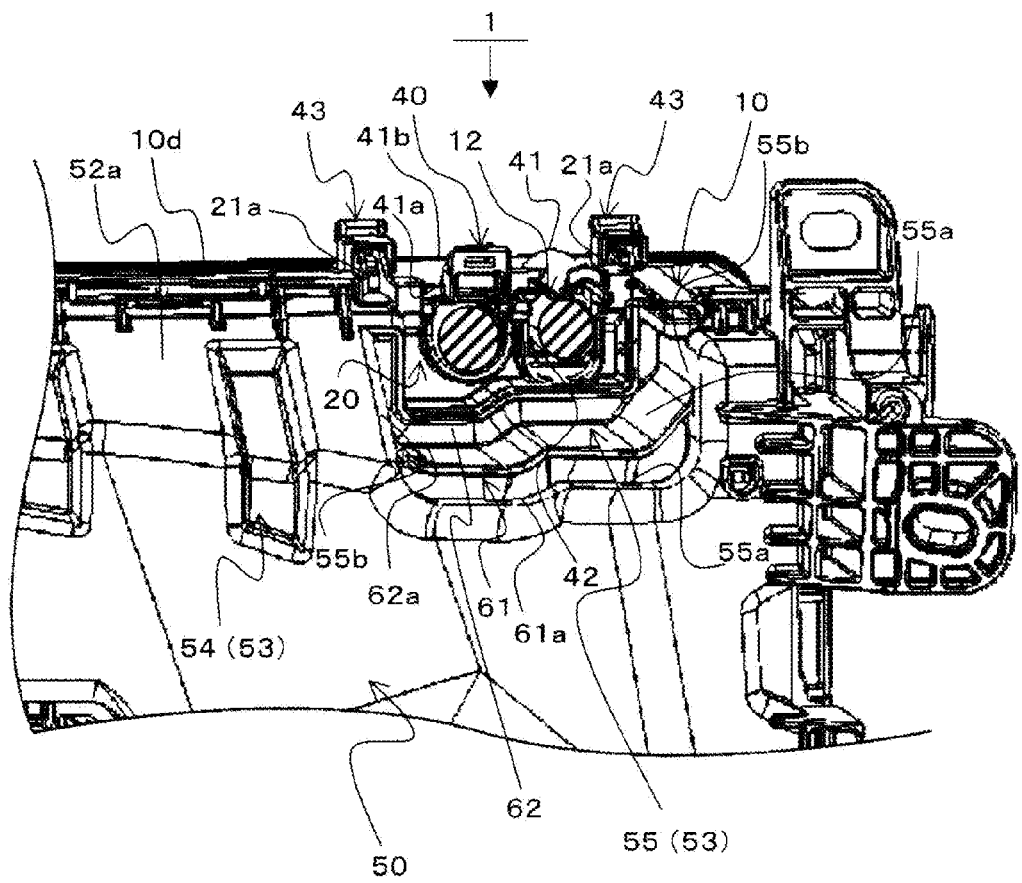
FIG. 4 is a view of the surroundings of a folded wall part of the electrical junction box shown in FIG. 2 when viewed from a lower side thereof.
Figure 5:
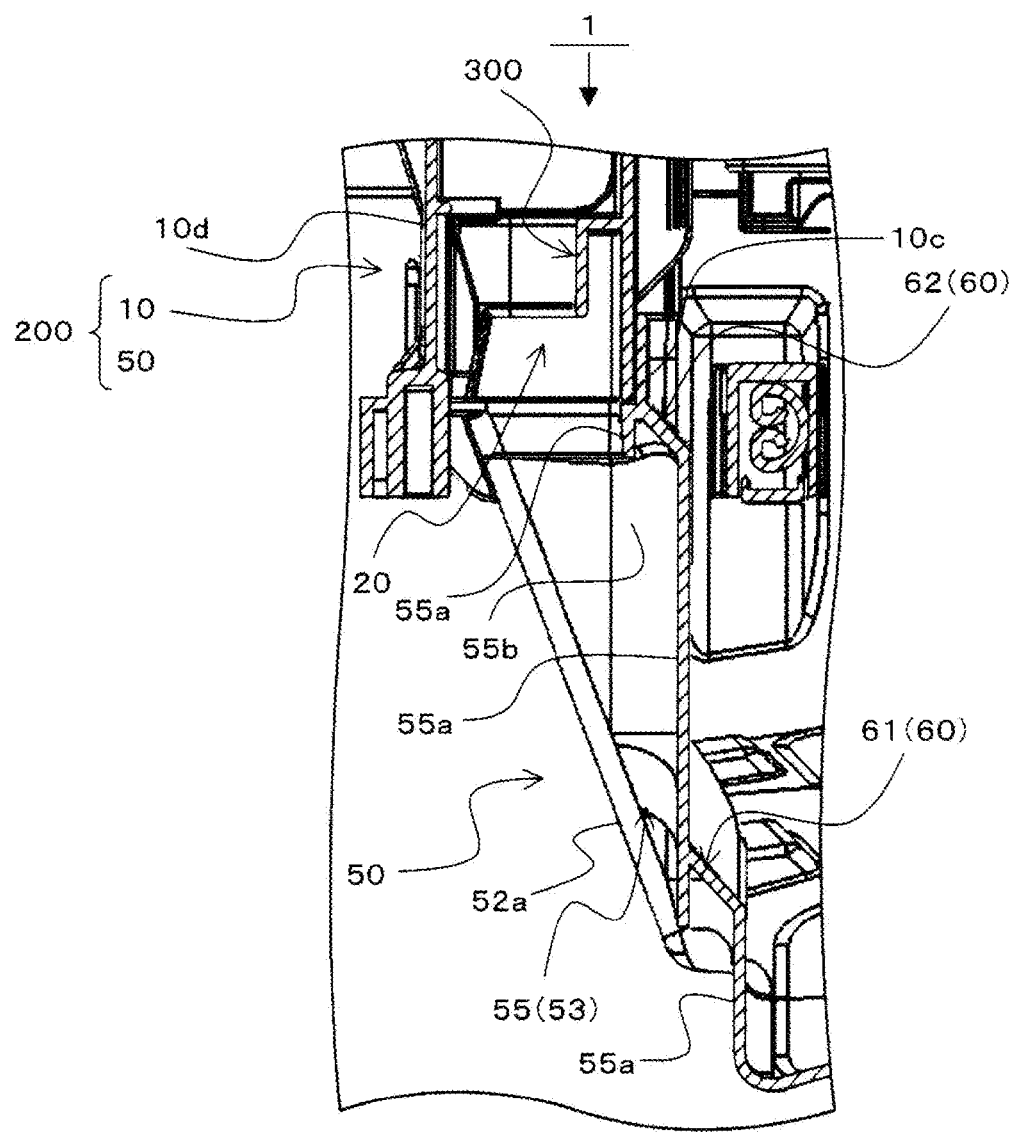
FIG. 5 is a sectional view of the electrical junction box taken along line A-A of FIG. 2.
Figure 6:
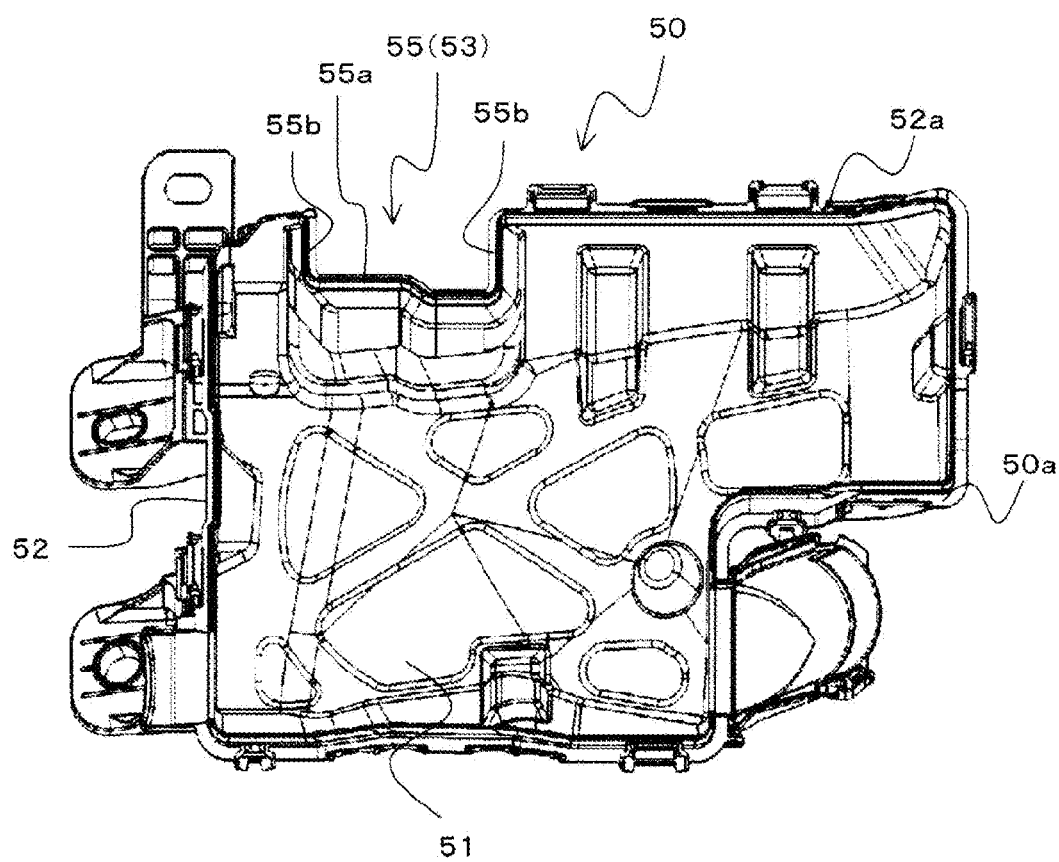
FIG. 6 is a view of a lower cover section shown in FIG. 1 when viewed from an upper opening thereof.
Figure 7:
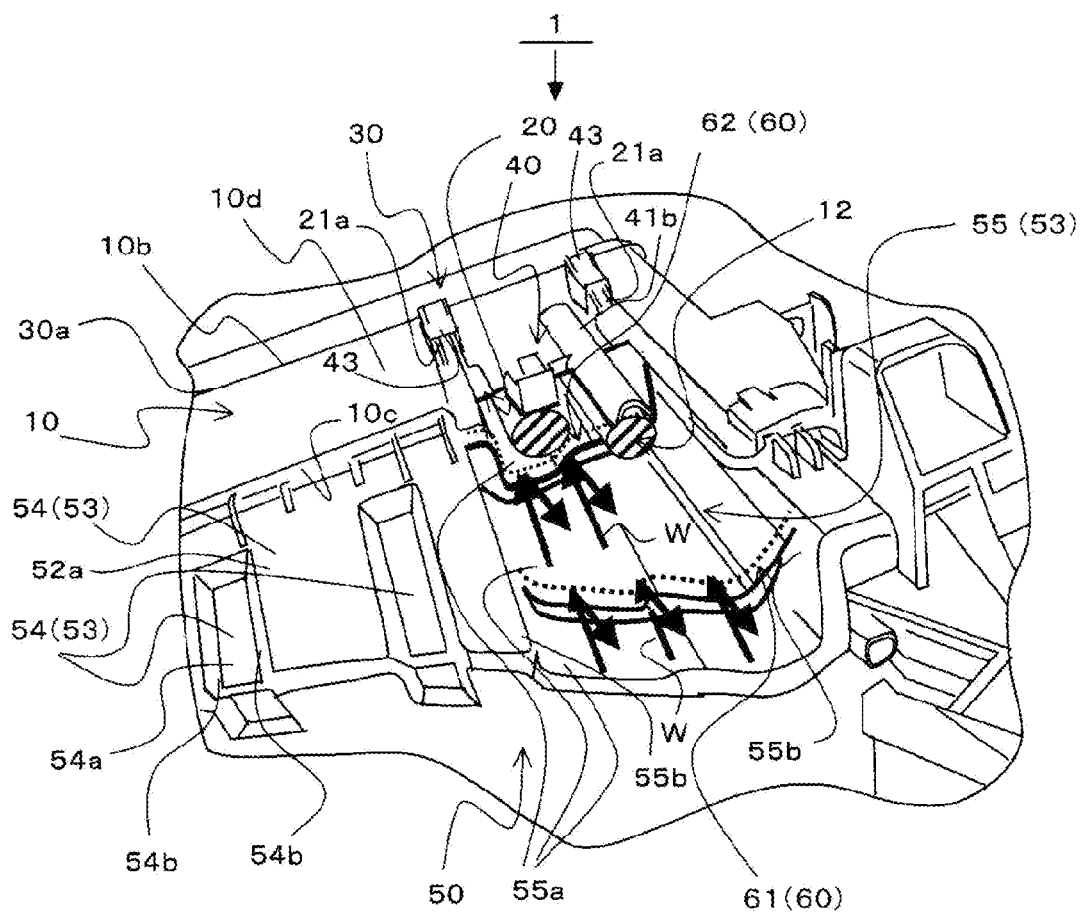
FIG. 7 is a view explaining the state where pressurized water is guided downwards by the folded wall part.
Figure 8:
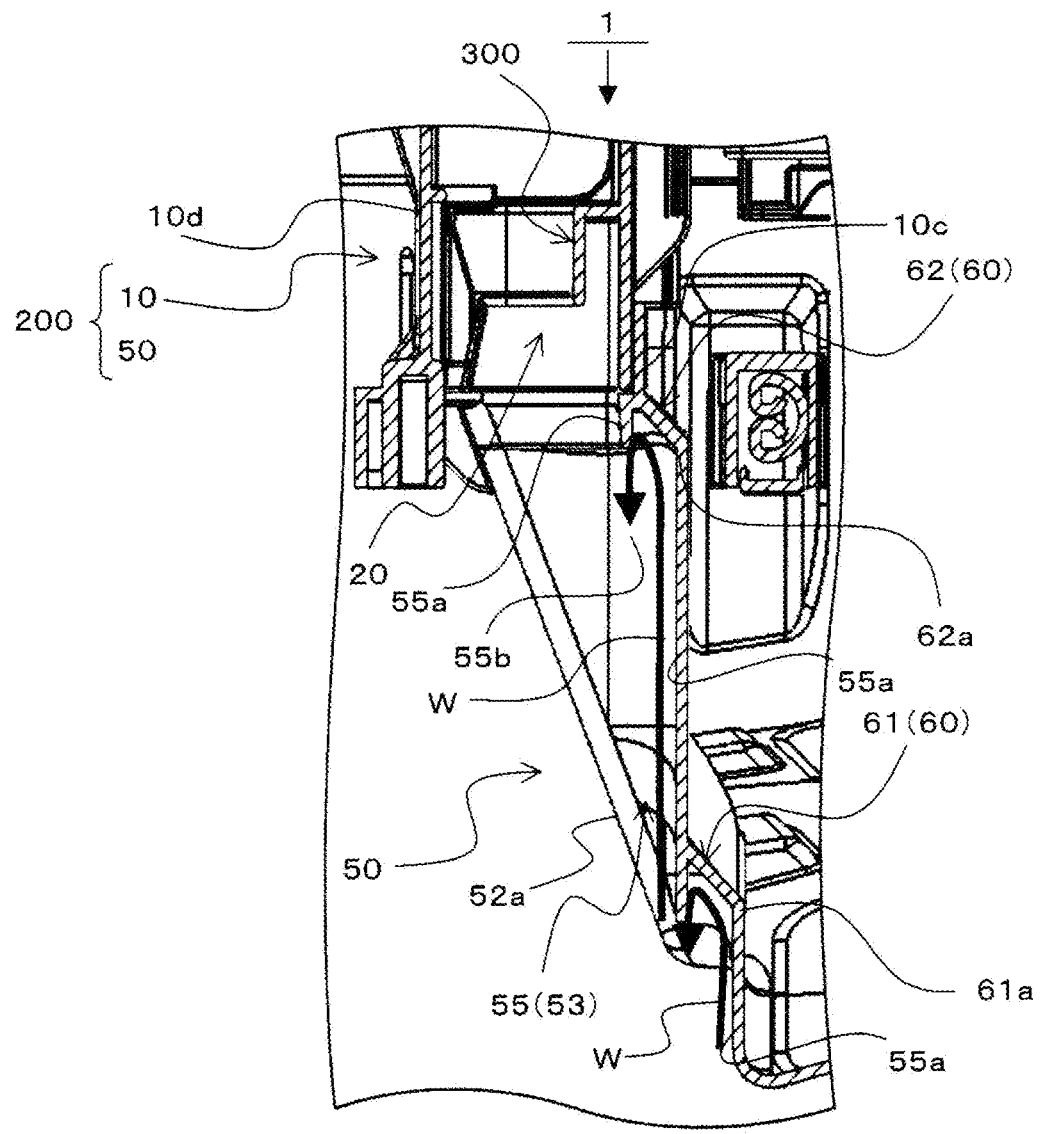
FIG. 8 is a view explaining the state where pressurized water is guided downwards by the folded wall part.
Figure 9:
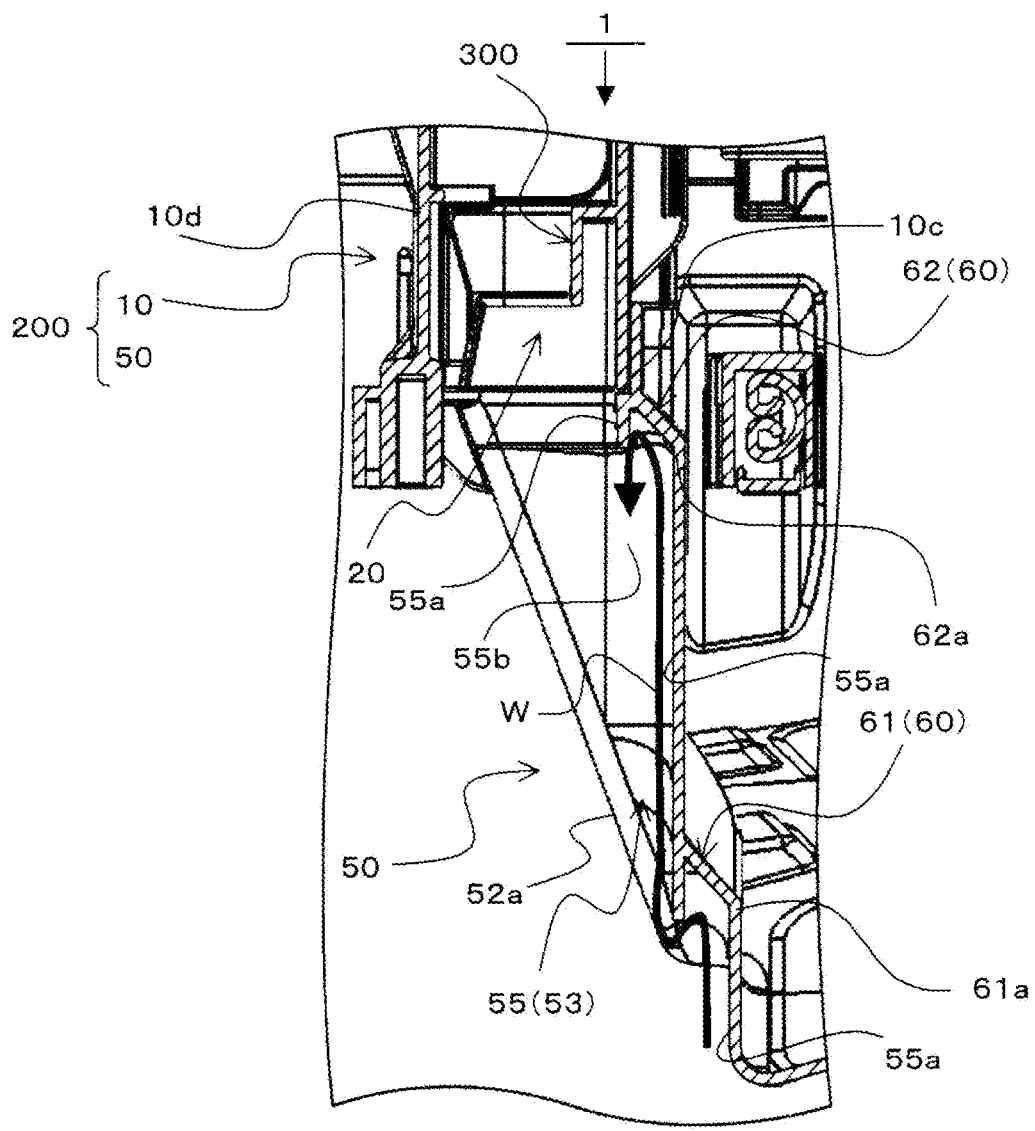
FIG. 9 is a view explaining the state where pressurized water is guided downwards by the folded wall part.
Figure 10:
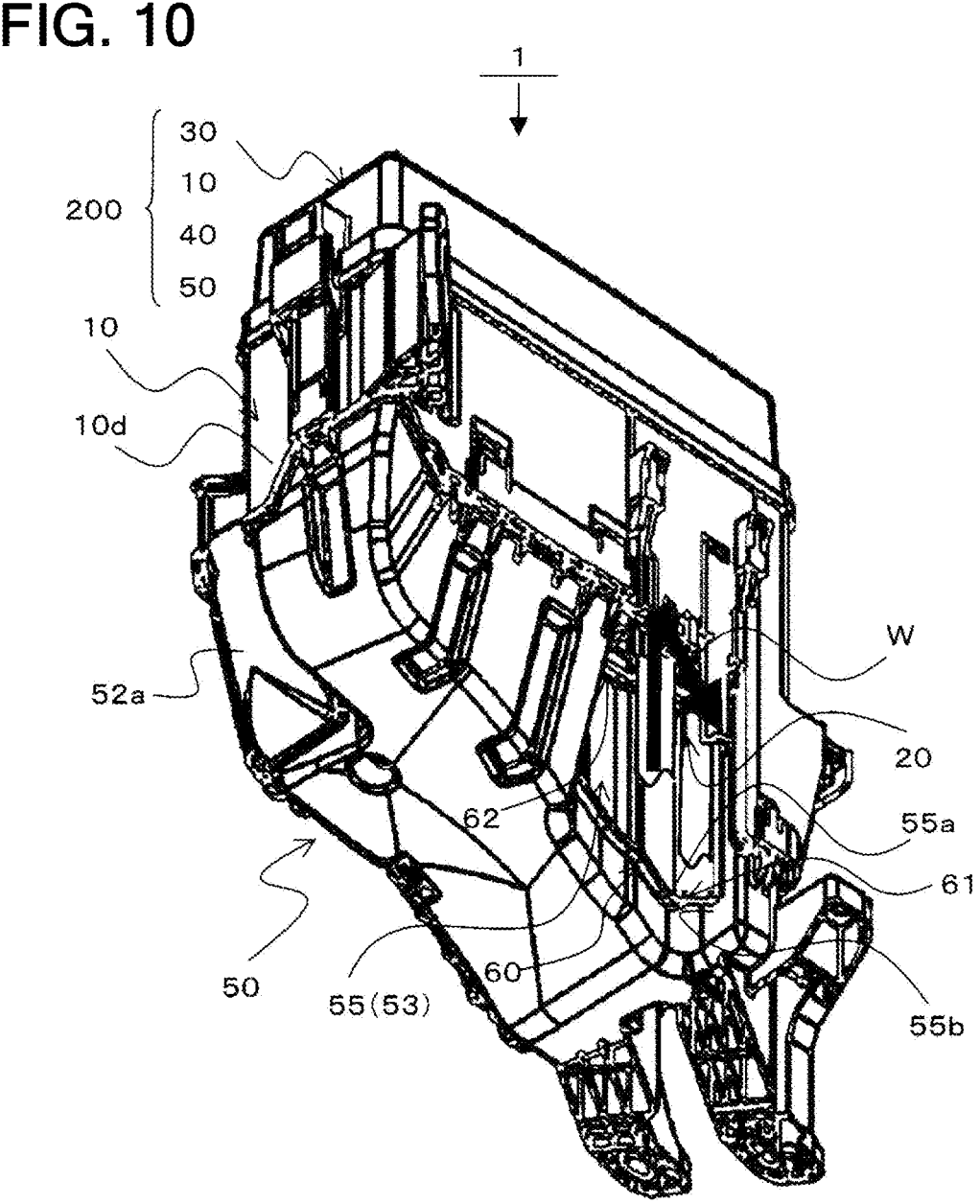
FIG. 10 is a view explaining the state where pressurized water is guided downwards by the folded wall part provided on a groove part on a box body as shown in FIG. 1.
Figure 11:
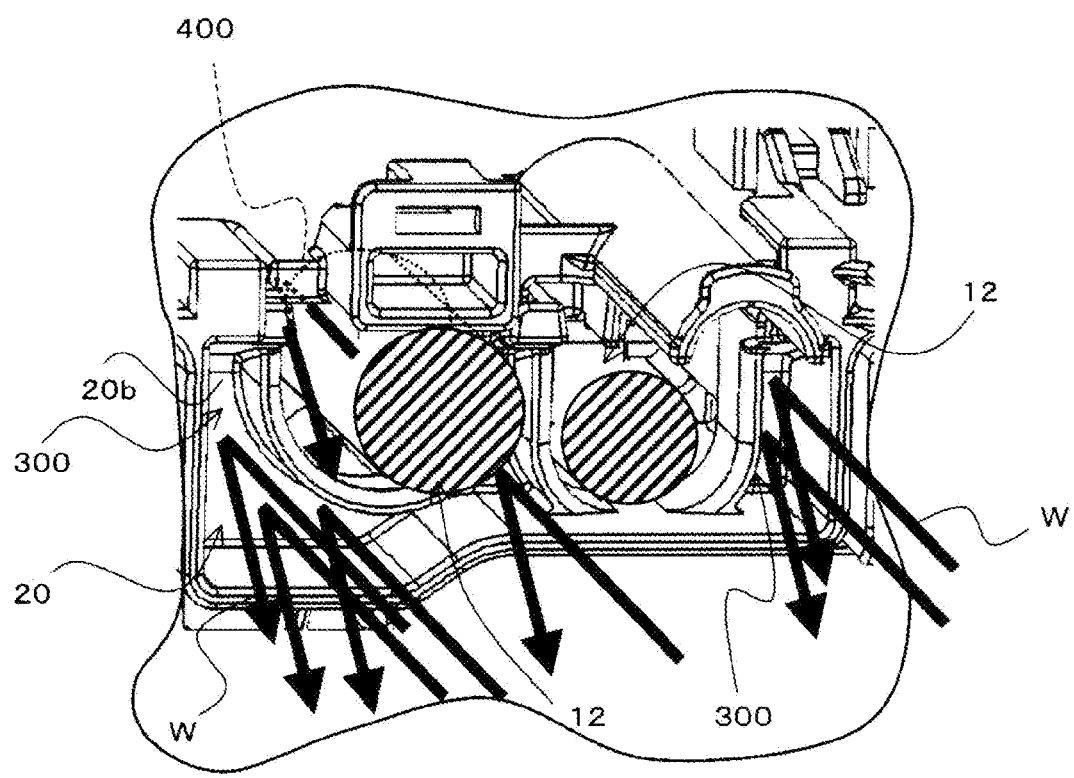
FIG. 11 is an enlarged view showing the surroundings of the folded wall part when viewing the groove part on the box body shown in FIG. 1 from a lower side thereof.

FIG. 1 is an exploded perspective view of an electrical junction box according to an illustrative embodiment of the present invention. FIG. 2 is a perspective view of the electrical junction box shown in FIG. 1. FIG. 3 is a view of the electrical junction box shown in FIG. 2 in which a side cover section 40 and an electrical connection member 12 are omitted. FIG. 4 is a view of the surroundings of a folded wall part 60 of the electrical junction box shown in FIG. 2 when viewed from a lower side thereof. FIG. 5 is a sectional view of the electrical junction box taken along line A-A of FIG. 2. FIG. 6 is a view of a lower cover section 50 shown in FIG. 1 when viewed from an upper opening thereof. FIGS. 7 to 9 are views explaining the state where pressurized water is guided downwards by the folded wall part 60. FIG. 10 is a view explaining the state where pressurized water is guided downwards by a folded wall part 300 provided on a groove part 20 on a box body as shown in FIG. 1. FIG. 11 is an enlarged view showing the surroundings of the folded wall part 300 when viewing the groove part 20 on the box body shown in FIG. 1 from a lower side thereof.

Here, FIGS. 2 and 3 show the inside of the electrical junction box by omitting an upper cover section 30.

The electrical junction box 1 according to an illustrative embodiment of the invention includes an accommodation cover 200 in which electrical parts 11a such as connectors, relays, fuses, etc. are contained.

The accommodation cover 200 includes a box body 10 in which electrical parts 11a are contained, an upper cover section which covers an upper portion of the box body 10, a side cover section 40 which is attached to the box body 10 to shield a wall surface 20a of a groove part 20 on the box body, and a lower cover section 50 which covers a lower portion of the box body 10. The accommodation cover 200 is provided, on an outer surface thereof, with a linear groove which extends in a vertical direction of the outer surface that consists of a box body-side outer surface part 10d and a lower cover-side outer surface part 52a. The groove consists of a groove part 20 on the box body and a groove part 53 on the lower cover section. The groove has folded wall parts 60 and 300 which are stepped downwards on a wall surface of the groove.

The box body 10 will now be described.

The box body 10 is made of electrically insulating synthetic resin, and has an outer contour that is defined by a barrel type outer wall. The box body has a partition wall 10a which allows a cassette block 11, in which electrical parts 11a such as connectors, relays, fuses, etc. are mounted, to be dividedly accommodated in the box body.

The box body 10 has, on the outer surface part 10d, the groove part 20 which extends linearly from an upper end to a lower end thereof and in which a connector 12a of an electrical connection member 12 is accommodated.

The electrical connection member 12 is an electric wire having a terminal, i.e., a connector. The connector 12a of the electrical connection member is accommodated in the groove part 20 on the box body. One end of the electrical connection member is connected to the electrical part 11a which is mounted in the cassette block 11 in the electrical junction box and the other end of the electrical connection member is drawn from the groove part 53 on the lower cover section 50, which will be described later, and is connected to an external component such as a battery that is not shown in the drawings.

Although the electrical connection member 12 is illustrated as an electric wire having a terminal, the electrical connection member is not limited thereto, but may employ other components that can electrically connect the electric part 11a in the electrical junction box 1 to an external power supply.

The side cover section 40 slides along the groove part 20 on the box body from the upper side toward the lower side and is attached to the groove part 20. A side cover engaging part 21 is provided in the proximity of opposite edges of the groove part 20 on the box body to engage the side cover section 40 at a position where the side cover section 40 slides along and is completely attached to the groove part.

As shown in FIG. 3, the side cover engaging part 21 includes a pair of elastic engaging pieces 21a in the proximity of the opposite edges of the wall surface 20a. Each of the elastic engaging pieces 21a is an elastic piece that slightly protrudes from the outer surface part 10d of the box body 10 and is curved upwards. The elastic engaging piece 21a has a protrusion 21b at the upwardly curved portion, and the side cover section 40 has another protrusion 43c which will be described later. The two protrusions 21b and 43c are coupled together, so that the side cover section 40 is engaged with the box body 10 at the attachment-completion position.

Next, the upper cover section 30 will be described.

As shown in FIGS. 1 to 3, the upper cover section 30 has a box shape whose bottom is opened, and is mounted to the box body 10 when a lower edge 30a thereof covers an upper edge 10b of the box body 10.

Next, the side cover section 40 will be described.

As shown in FIGS. 1, 2, and 4, the side cover section 40 has an engaging part 42 (see FIG. 4) for fixing the electrical connection member 12 to a planar base part 41 that serves as a main body part, and a pair of engaging surrounding wall parts 43 which are engaged with the respective elastic engaging pieces 21a of the side cover engaging part 2.

The engaging part 42 for the electrical connection member is provided on a surface 41a on the side where the planar base part 41 is attached to the box body 10. Thus, when the side cover section 40 is attached to the box body 10 to cover the wall surface 20a thereof, the connector 12a of the electrical connection member 12 is accommodated in the groove part 20 on the box body.

Each of the engaging surrounding wall parts 43 in a pair has a surrounding wall portion 43a which is provided on an outer surface 41b of the planar base part 41 at a position corresponding to the respective elastic engaging pieces 21a of the box body 10 to allow the curved portion of the elastic engaging piece 21a to be inserted there, and an elastic piece part 43b which is formed by a cutting part that is provided downwards from an upper end of the surrounding wall portion 43a to form a portion of the upper end of the surrounding wall portion 43a as a free end. A protrusion 43c on an inner surface of the elastic piece part 43b is engaged with the protrusion 21b of the elastic engaging piece 21a.

Next, the lower cover section 50 will be described.

The lower cover 50 has a box shape which has an opened upper surface, a bottom wall part 51, and a surrounding side wall part 52 which stands up from a circumference of the bottom wall part 51. The lower cover section is mounted to the box body 10 when a circumference 50a of an upper end thereof covers a circumference 10c of a lower end of the box body 10.

The lower cover section 50 has the groove part 53 which is provided on the outer surface part 52a to extend linearly from an upper end to a lower end thereof.

The groove part 53 on the lower cover section has a groove part 54 which is provided to reinforce the lower cover section 50, and a connection groove part 55 which is provided in the proximity of the groove part 20 on the box body to extend the groove part 20 downwards.

The lower cover section 50 has a folded wall part 60 which configures a wall part at which a wall surface 55a of the connection groove part 55 is folded downwards.

The folded wall part 60 consists of upper and lower wall parts that are provided at an interval along a longitudinal direction of the connection groove part 55.

The lower folded wall part 61 is provided to continuously extend across the wall surface 55a from one side to another side between the opposite groove sides 55b.

The lower folded wall part 61 has an obtuse angled folded part 61a which is formed at an obtuse angle relative to the wall surface 55a. Thus, the lower folded wall part 61 is folded at an obtuse angle relative to the wall surface 53a, and then is folded again downwards after extending in the folded direction.

The obtuse angled folded part 61a allows water not to stay in the lower folded wall part 61, but to be smoothly guided downwards from the lower cover section 50.

The upper folded wall part 62 is provided above the lower folded wall part 61, and is defined by a wall at which the wall surface 55a extending upwards from the lower folded wall part 61 is folded.

Like the lower folded wall part 61, the upper folded wall part 62 is provided to continuously extend across the wall surface 53a from one side to another side between the opposite groove sides 53b.

Like the lower folded wall part 61, the upper folded wall part 62 has an obtuse angled folded part 62a which is formed at an obtuse angle relative to the wall surface 55a. Thus, the upper folded wall part 62 is folded at an obtuse angle relative to the wall surface 55a, and then is folded again downwards after extending in the folded direction.

When the folded wall parts 60 are provided at a plurality of positions, stepped channel surfaces 55a are provided downwards from the respective folded wall parts 60 to guide water into the respective folded wall parts 60.

Thus, the wall surface 55a is formed for each step, and the water is guided to the respective folded wall parts 60 along the single channel surfaces 55a positioned downwards from the respective folded wall parts.

Since a water flow guided to the respective folded wall parts 60 depends on an area of the wall surface 55a positioned below the respective folded wall parts, it may be configured that the size of a water inlet of the respective folded wall parts 60 may be set to correspond to an area of the wall surface 55a below the folded wall parts.

As shown in FIGS. 10 and 11, the electrical junction box according to an embodiment of the invention includes a folded wall part 300 at which a wall surface 20b of the groove part 20 on the box body 10 is folded downwards.

The folded wall part 300 provided on the groove part 20 on the box body extends along a circumference of the electrical connection member 12 disposed in the groove part 20 to reduce a gap with the electrical connection member 12.

Thus, water is prevented from escaping through a gap between the electrical connection member 12 and the wall surface 20b of the groove part 20 on the box body 20, and flowing upwards.

The side cover section 40 includes a surrounding wall part 400 to surround a circumference of the electrical connection member 12, which is disposed in the groove part 20 on the box body together with the folded wall part 300 provided in the groove part 20, to reduce a gap with the electrical connection member 12.

Thus, water is prevented from escaping through gaps between the electrical connection member 12 and the wall surface 20b of the groove part 20 on the box body and between the side cover section 40 and the electrical connection member 12, and flowing upwards.

When an engine room in which the electrical junction box 1 is mounted is washed with pressurized water, as shown in FIGS. 7 and 8, water that flowed upwards along the wall surface 55a below the lower folded wall part 61 is guided to the lower folded wall part and is discharged downwards from the lower cover section 50.

Here, since, as indicated by the arrow W in FIG. 8, the water does not stay in the lower folded wall part 61 and is smoothly guided downwards from the lower cover section 50 by the obtuse angled folded part 61a, it is difficult for the water to stay in the lower folded wall part 61.

The water that flowed upwards along the wall surface 55a of the lower folded wall part 61 is guided to the upper folded wall part 62 and is discharged downwards from the lower cover section 50. Here, like the lower folded wall part 61, since the water does not stay in the upper folded wall part 62 and is smoothly guided downwards from the lower cover section 50 by the obtuse angled folded part 62a, it is difficult for the water to stay in the upper folded wall part 62.

Here, when water flows upwards over the lower folded wall part 61 as indicated by the arrow W in FIG. 9, the water is guided downwards from the lower cover section 50 by the upper folded wall part 62.

Thus, water flowing upwards along the wall surface 55a of the groove part 53 is guided downwards from the lower cover section 50 before reaching the box body 10.

Even when water flows upwards from the lower cover section 50 to the box body 10 as indicated by the arrow W in FIGS. 10 and 11, the water is guided downwards from the groove part 20 on the box body by the folded wall part 300 (see FIG. 11) provided in the groove part 20 on the box body.

Since the gaps between the electrical connection member 12 and the wall surface 20b of the groove part 20 on the box body and between the side cover section 40 and the electrical connection member 12 are surrounded and blocked by the folded wall part 300 and the surrounding wall part 400, water is more securely guided downwards from the groove part 20 on the box body by the folded wall part 300 and the surrounding wall part 400.

In the electrical junction box 1 according to an embodiment of the invention, water flowing upwards along the wall surface 55a of the connection groove part 55 or the wall surface 20b of the groove part 20 on the box body is guided downwards from the accommodation cover 200 by the folded wall parts 60 and 300, thereby preventing the water from coming into the junction box through the groove extending linearly in a vertical direction of the accommodation cover 200.

In the electrical junction box 1 according to an embodiment of the invention, water flowing upwards along the wall surface 55a of the connection groove part 55 is guided downwards from the lower cover section 50 by the folded wall part 60 before reaching the box body 10, thereby preventing the water from coming into the junction box through the groove part on eh lower cover section which extends linearly in a vertical direction of the lower cover section 50.

In the electrical junction box 1 according to an embodiment of the invention, water flowing upwards from the connection groove part 55 on the lower cover section 50 along the groove part 20 on the box body is guided downwards from the lower cover section 50 by the folded wall part 60 before reaching the box body 10, thereby preventing the water from coming into the junction box along the groove part 53 on the lower cover section extending linearly in a vertical direction of the lower cover section 50 and further along the groove part 20 on the box body.

In the electrical junction box 1 according to an embodiment of the invention, the folded wall part 300 is provided to block a gap between the electrical connection member 12 and the groove part 20 on the box body, thereby preventing the water from escaping from the gap between the electrical connection member 12 and the wall surface 20b of the groove part 20 on the box body and flowing upwards.

In the electrical junction box 1 according to an embodiment of the invention, the folded wall part 300 provided on the groove part 20 on the box body and the surrounding wall part 400 of the side cover section 40 are provided to surround and block gaps between an outer circumference of the electrical connection member 12 and the wall surface 20b of the groove part 20 on the box body and between the outer circumference of the electrical connection member 12 and the side cover section 40, thereby preventing the water from escaping from the gaps between the electrical connection member 12 and the wall surface 20b of the groove part 20 on the box body and between the electrical connection member 12 and the side cover section 40 and flowing upwards.

In the electrical junction box 1 according to an embodiment of the invention, a majority of the water flowing upwards along the wall surface 55a of the groove is guided to the folded wall part 60.

In the electrical junction box 1 according to an embodiment of the invention, in a case where water flows upwards over the lower folded wall part 61, or water flows upwards over the lower folded wall part and further over the upper folded wall part 62, the water is guided downwards from the accommodation cover 200 by the upper folded wall part 62 or the folded wall part 300 provided in the groove part 20 on the box body, thereby more securely preventing the water from coming into the junction box along the groove part 53 on the lower cover section and the groove part 20 on the box body both extending linearly in a vertical direction of the accommodation cover 200.

In the electrical junction box 1 according to an embodiment of the invention, the water is smoothly guided downwards from the lower cover section 50 by the obtuse angled folded parts 61a and 62a and stays in the folded wall part 60, thereby preventing the water from flowing upwards over the folded wall part 60.

(First Modified Embodiment)

Figure 12:
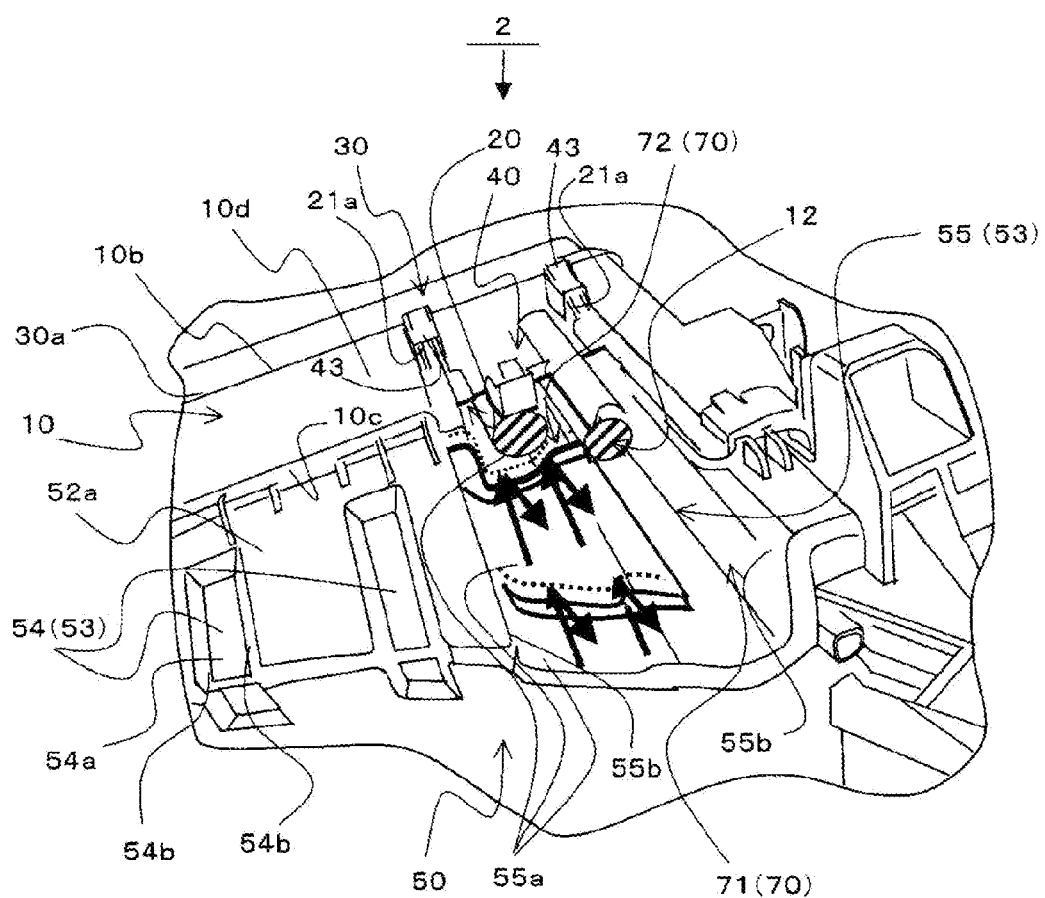
FIG. 12 is a view showing the surroundings of the folded wall part when obliquely viewing an electrical junction box according to a first modified embodiment from a lower side thereof.

Next, a first modified embodiment of the electrical junction box 1 of the former embodiment will be described with reference to FIG. 12. FIG. 12 is a view showing the surroundings of a folded wall part 70 of an electrical junction box 2 according to the first modified embodiment when obliquely viewed from a lower side thereof.

The electrical junction box 2 of the first modified embodiment is different from the electrical junction box 1 of the former embodiment in that folded wall parts 70 are not provided to continuously extend across a wall surface 53a from one to another between opposite groove sides 53b.

The other configuration is identical to that of the former embodiment, and like reference signs indicate like elements in the former embodiment.

The folded wall part 70 consists of lower and upper folded wall parts 71 and 72, and each of the folded wall parts 71 and 72 extends partially between the opposite groove sides 53b.

Although the electrical junction box 2 of the first modified embodiment has a reduced ratio of water that is guided to the folded wall parts 71 and 72, compared to the electrical junction box 1 of the former embodiment, like the electrical junction box 1 of the former embodiment, the water flowing upwards along the wall surface 55a of the connection groove part 55 is guided downwards from the lower cover section 50 by the folded wall part 70 before reaching the box body 10, thereby preventing the water from coming into the junction box along the groove part extending linearly in a vertical direction of the lower cover section 50.

(Second Modified Embodiment)

Figure 13:
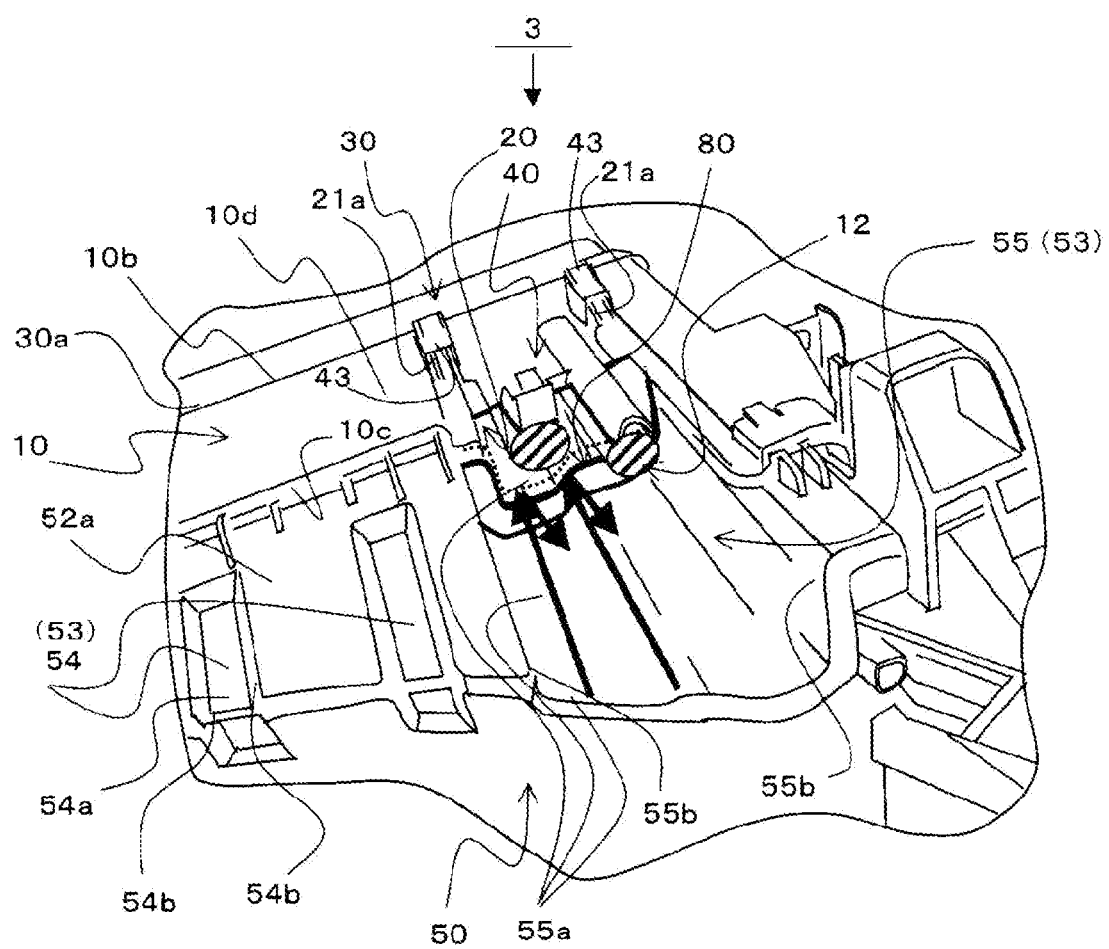
FIG. 13 is a view showing the surroundings of a folded wall part when obliquely viewing an electrical junction box according to a second modified embodiment from a lower side thereof.

Next, a second modified embodiment of the electrical junction box 1 of the former embodiment will be described with reference to FIG. 13. FIG. 13 is a view showing the surroundings of a folded wall part 80 of an electrical junction box 3 according to the second modified embodiment when obliquely viewed from a lower side thereof.

The electrical junction box 3 of the second modified embodiment is different from the electrical junction box 1 of the former embodiment in that the folded wall part 80 is provided at only one site.

The other configuration is identical to that of the former embodiment, and like reference signs indicate like elements in the former embodiment.

In the electrical junction box 3 of the second modified embodiment, like the electrical junction box 1 of the former embodiment, water flowing upwards along the wall surface 55a of the connection groove part 55 is guided downwards from the lower cover section 50 by the folded wall part 80 before reaching the box body 10, thereby preventing the water from coming into the junction box along the groove part extending linearly in a vertical direction of the lower cover section 50.

(Third Modified Embodiment)

Figure 14:
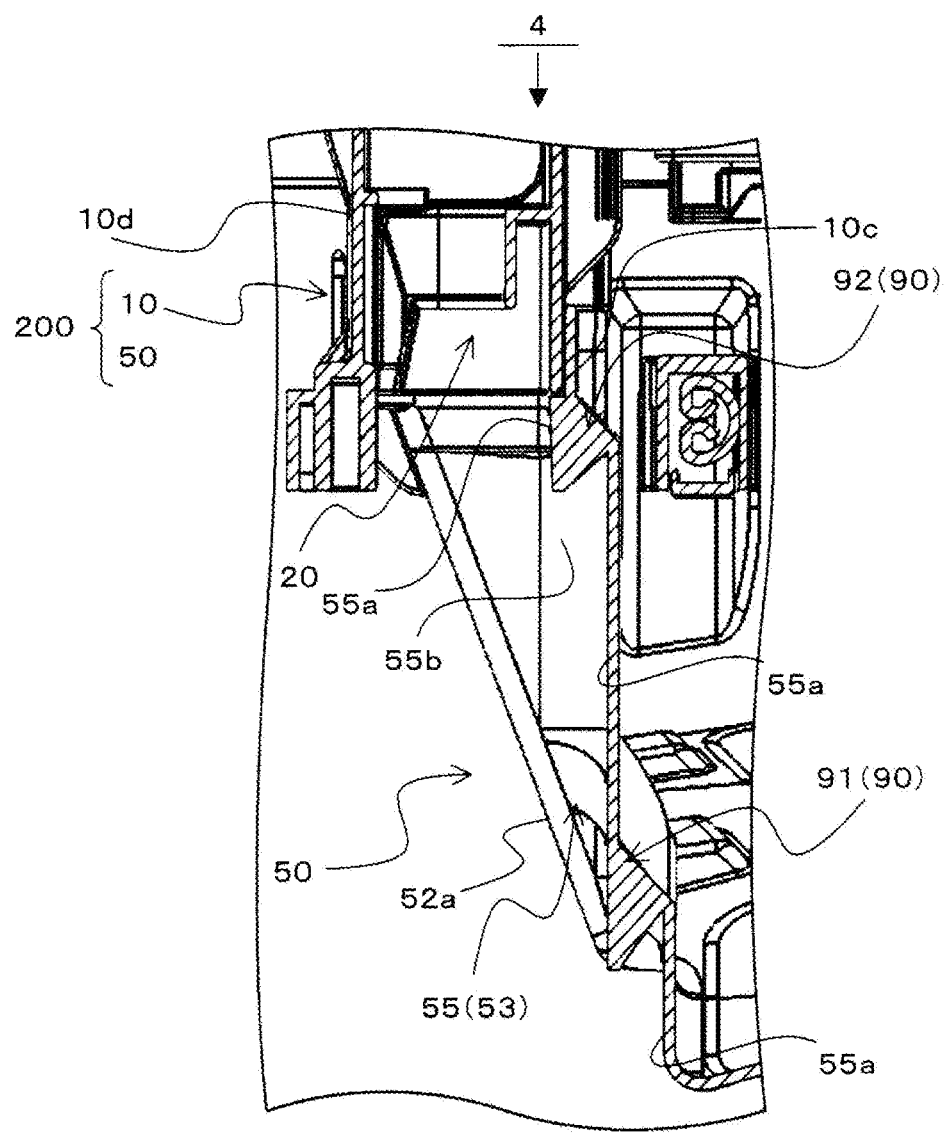
FIG. 14 is a sectional view showing the surroundings of a folded wall part of an electrical junction box according to a third modified embodiment.

Next, a third modified embodiment of the electrical junction box 1 of the former embodiment will be described with reference to FIG. 14. FIG. 14 is a sectional view showing the surroundings of a folded wall part 90 of an electrical junction box 4 according to the third modified embodiment.

The electrical junction box 4 of the third modified embodiment is different from the electrical junction box 1 of the former embodiment in that lower and upper folded wall parts 91 and 92 configuring a folded wall part 90 are folded at acute angles relative to the wall surface 55a.

The other configuration is identical to that of the former embodiment, and like reference signs indicate like elements in the former embodiment.

In the electrical junction box 4 of the third modified embodiment, like the electrical junction box 1 of the former embodiment, water flowing upwards along the wall surface 55a of the connection groove part 55 is guided downwards from the lower cover section 50 by the folded wall part 90 before reaching the box body 10, thereby preventing the water from coming into the junction box along the groove part extending linearly in a vertical direction of the lower cover section 50.

(Fourth Modified Embodiment)

Figure 15:
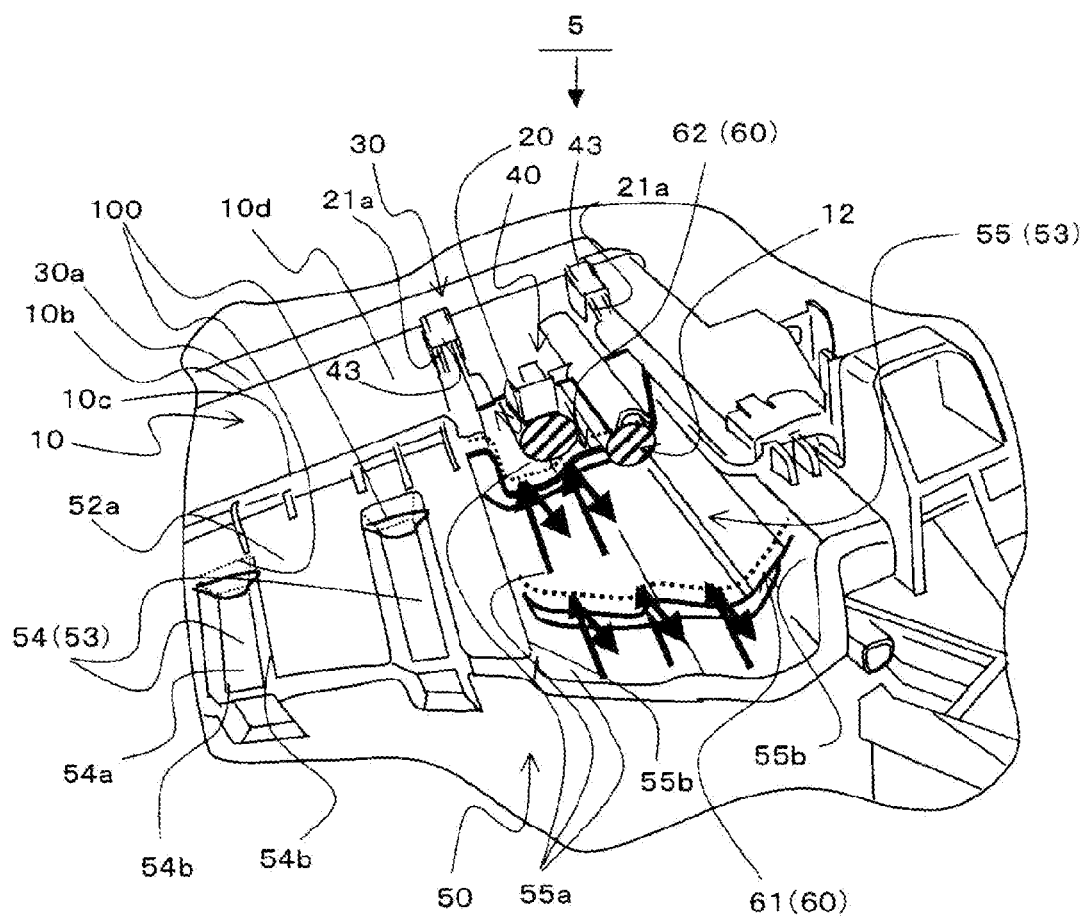
FIG. 15 is a view showing the surroundings of a folded wall part when obliquely viewing an electrical junction box according to a fourth modified embodiment from a lower side thereof.

Next, a fourth modified embodiment of the electrical junction box 1 of the former embodiment will be described with reference to FIG. 15. FIG. 15 is a view showing the surroundings of a folded wall part 100 of an electrical junction box 5 according to the fourth modified embodiment when obliquely viewed from a lower side thereof.

The electrical junction box 5 of the fourth modified embodiment is different from the electrical junction box 1 of the former embodiment in that the folded wall part 100 is further provided on a reinforcing groove part 54.

The other configuration is identical to that of the former embodiment, and like reference signs indicate like elements in the former embodiment.

The folded wall part 100 is formed as a wall at which the wall surface 54a of the reinforcing groove part 54 is folded downwards.

In the electrical junction box 5 of the fourth modified embodiment, like the electrical junction box 1 of the former embodiment, water flowing upwards along the wall surface 55a of the connection groove part 55 is guided downwards from the lower cover section 50 by the folded wall part 100 before reaching the box body 10, thereby preventing the water from coming into the junction box along the groove part extending linearly in a vertical direction of the lower cover section 50.

Further, water flowing upwards along a wall surface 54a of the reinforcing groove part 54 is guided downwards from the lower cover section 50 by the folded wall part 100 before reaching the box body 10, thereby preventing the water from coming into the junction box along the groove part extending linearly in a vertical direction of the lower cover section 50.

Although the embodiments of the invention have illustrated that the electrical junction box 1, 2, 3, 4, or 5 has the folded wall part 60, 70, 80, 90, 100, or 300 that is provided on the connection groove part 55 of the lower cover section 50, the groove part 20 on the box body, or further the reinforcing groove part 54, the invention is not limited to the embodiments. The folded wall part may be provided on any other groove part if the groove part extends linearly in a vertical direction.

Although the invention contrived by the inventors has been described in detail based on the above-mentioned illustrative embodiments, the invention is not limited thereto, and various modifications are possible, without departing from the scope and spirit of the invention.

What is claimed is:

1. An electrical junction box comprising:
   an accommodation cover in which electrical parts are accommodated; and
   a groove that is formed on an outer surface of the accommodation cover and linearly extends in an up-down direction of the accommodation cover,
   wherein the accommodation cover includes a folded wall part at which a wall surface of the groove is folded downwards,
   wherein the accommodation cover includes:
      a box body in which the electrical parts are accommodated; and
      a lower cover that covers a lower portion of the box body,
   wherein the groove includes a first groove part formed on the lower cover, and the folded wall part is formed on the first groove part,
   wherein the groove includes a second groove part that is formed on the box body and linearly extends from an upper side to a lower side of the box body and accommodate a connector of an electrical connection member and, the first groove part downwardly extends so as to connect with the second groove part.

2. The electrical junction box according to claim 1, wherein the folded wall part is provided to extend along an outer circumference of the electrical connection member to reduce a gap with the electrical connection member disposed in the second groove part.

3. The electrical junction box according to claim 2, wherein the accommodation cover covers a groove opening of the second groove part and includes a side cover section having a surrounding wall part to surround the outer circumference of the electrical connection member disposed in the second groove part to reduce the gap with the electrical connection member together with the folded wall part provided on the second groove part.

4. The electrical junction box according to claim 1, wherein the folded wall part is provided to continuously extend across the wall surface from one side to another side between opposite groove sides.

5. The electrical junction box according to claim 1, wherein the folded wall part includes a plurality of folded wall parts provided at a plurality of positions at an interval along a longitudinal direction of the groove and is defined as a wall at which the wall surface is folded such that an upper folded part thereof extends upwards from a lower folded wall part thereof.

6. The electrical junction box according to claim 1, wherein the folded wall part includes an obtuse angled folded part folded at an obtuse angle relative to the wall surface.

* * * * *